Dec. 10, 1968     I. V. K. HOTT     3,415,342
VEHICLE LIFTING APPARATUS
Filed June 28, 1967     3 Sheets-Sheet 1
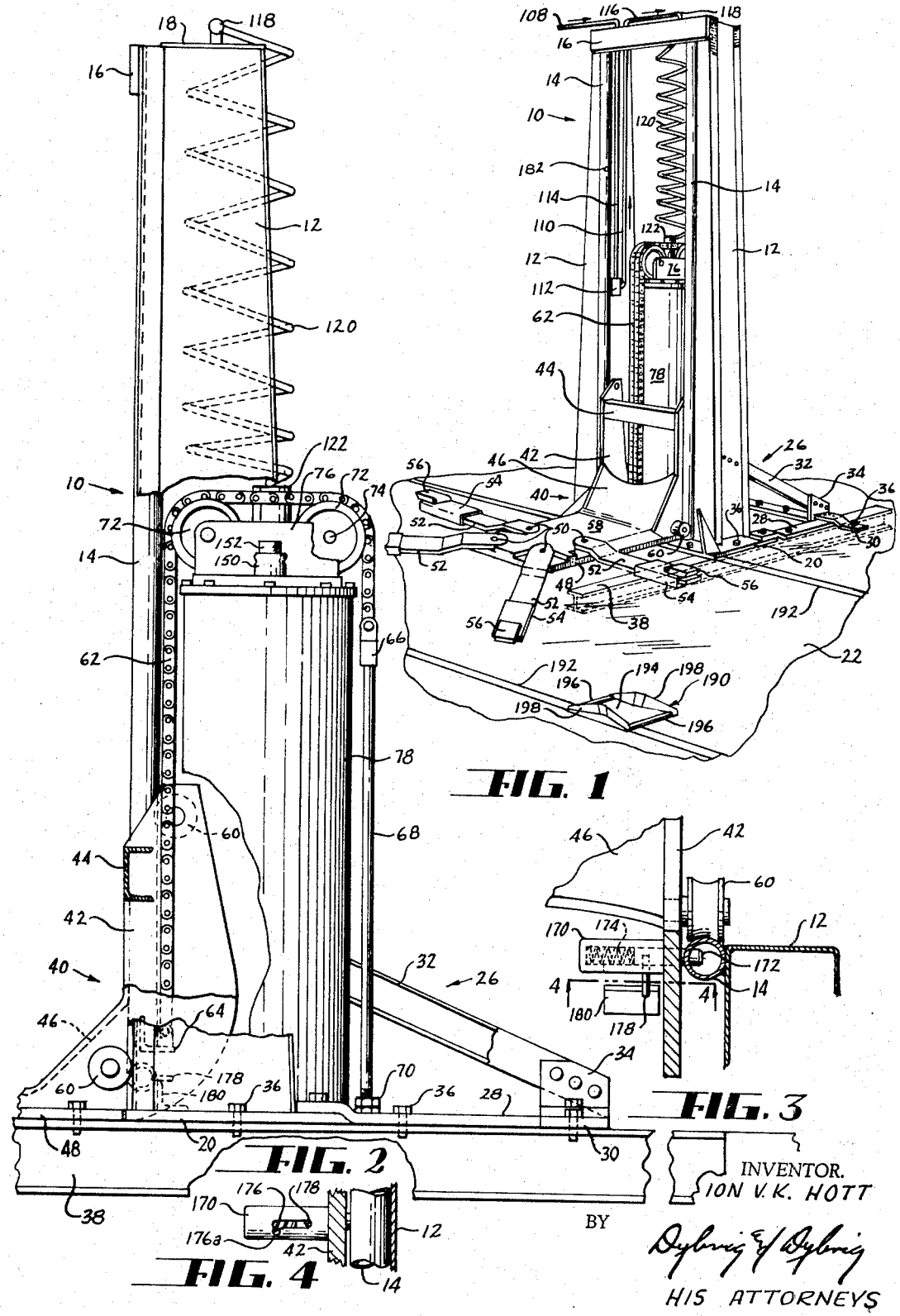
INVENTOR.
ION V. K. HOTT

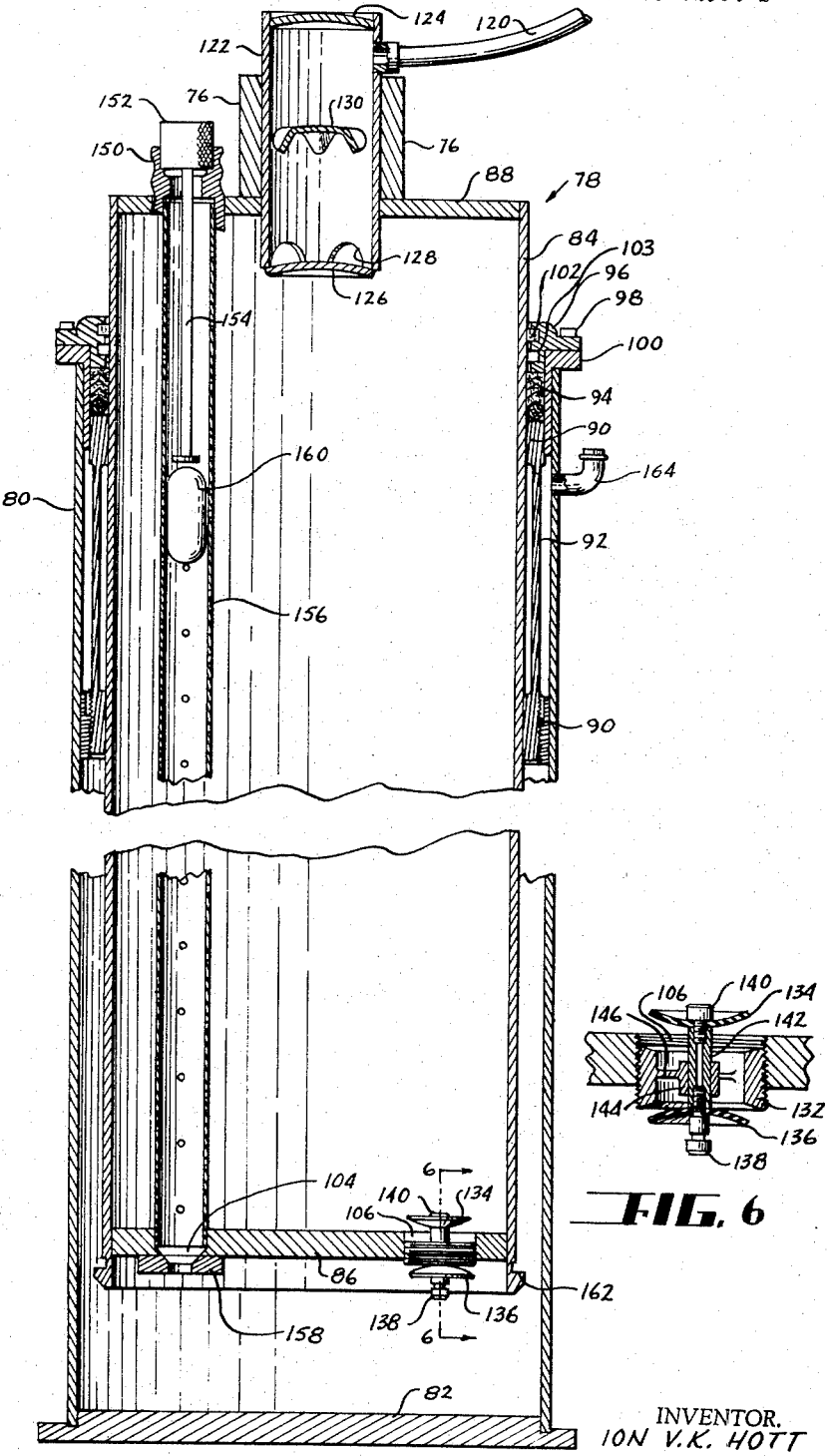

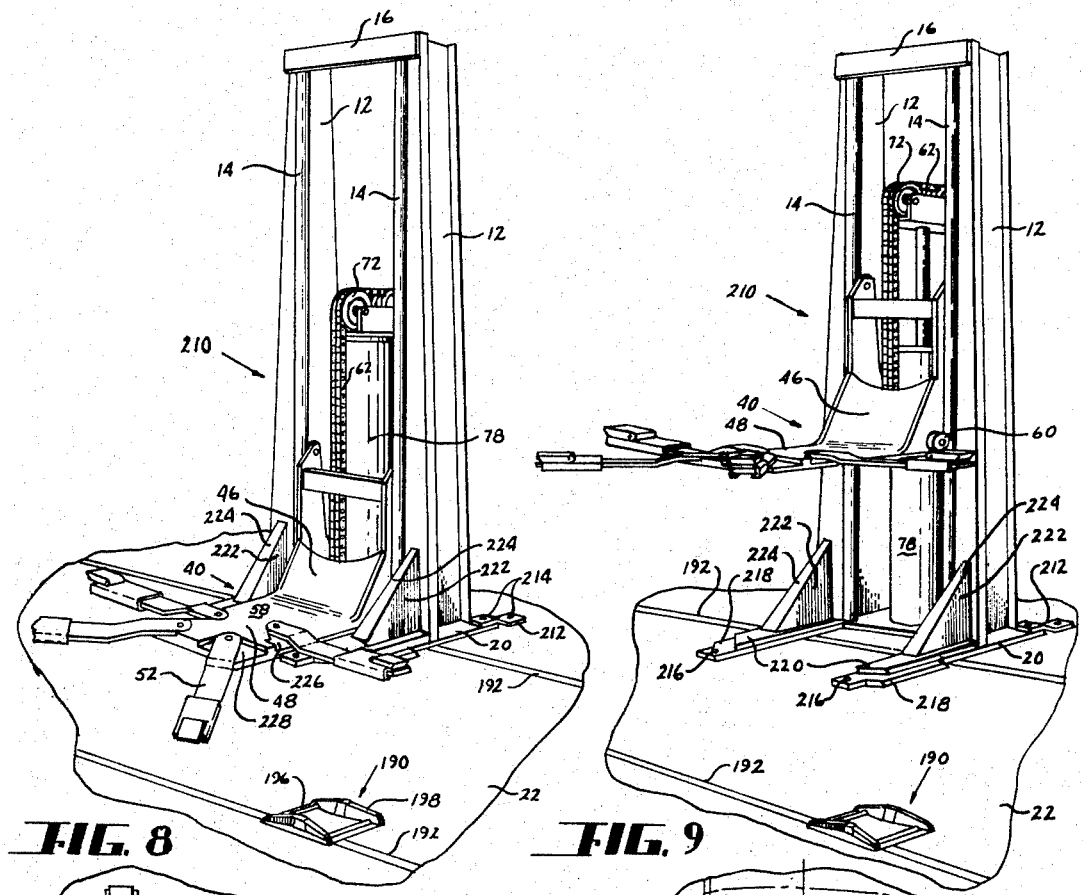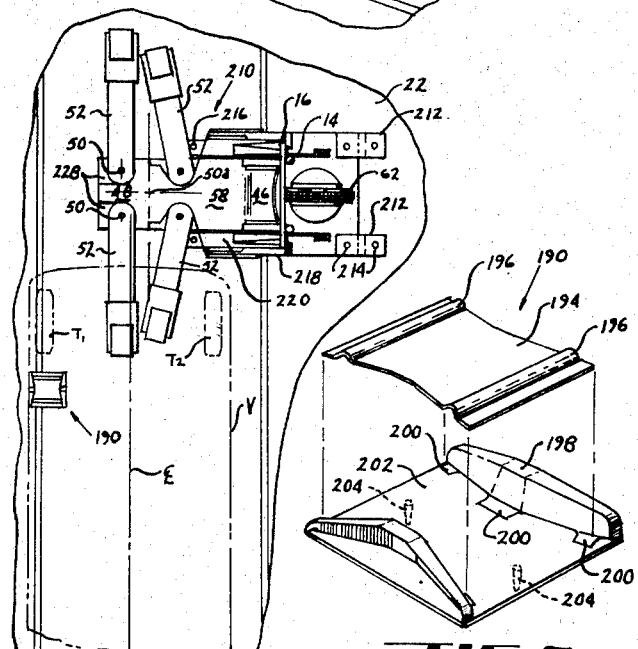

United States Patent Office 3,415,342
Patented Dec. 10, 1968

3,415,342
VEHICLE LIFTING APPARATUS
Ion V. K. Hott, Dayton, Ohio, assignor to The Joyce-Cridland Company, Dayton, Ohio, a corporation of Ohio
Continuation-in-part of application Ser. No. 474,825, July 26, 1965. This application June 28, 1967, Ser. No. 649,497
19 Claims. (Cl. 187—8.41)

ABSTRACT OF THE DISCLOSURE

A vehicle is raised by a frame contact lift having four rails pivoted on a carriage vertically driven by a floor-mounted jacking unit located on one side of the vehicle. Alignment of the vehicle relative to the jacking unit and carriage is indicated by a wheel locater plate and, in one embodiment, by braces or gussets adjacent the floor and the vehicle lift chassis. A semihydraulic jacking unit is provided with a low oil control valve and a speed control valve. The latter valve opens to increase the descending speed of the carriage as the vehicle engages the floor.

---

This application is a continuation-in-part of my co-pending application, Ser. No. 474,825, titled, "Vehicle Lifting Apparatus," and filed in the United States Patent Office on July 26, 1965, now abandoned.

This invention relates to a vehicle lifting apparatus and more particularly to that type of lifting apparatus in which the entire structure is located above the floor or ground level. However, as will become apparent from the following description, the invention or portions thereof are not necessarily so limited.

An object of this invention is to provide improved vehicle lifting apparatus adapted to be located above the floor or ground level, but embodying advantages of vehicle lifting apparatus employing a jacking unit located in a pit or the like below ground level. It is also an object to provide such lifting apparatus capable of contacting or engaging frame portions of the vehicle to be lifted. To minimize floor space devoted to the lifting apparatus, a single jacking unit is used to drive a single bolster upon which are pivoted four rails or swing arms. The vehicle is located over the bolster off-center from the middle of the pivot points for the swing arms so that the load will be closer to the packing unit. The two swing arms farthest from the jacking unit can pivot through a greater angle than the other two swing arms in order to reach frame contact points on the far side of the vehicle.

Another object of this invention resides in the provision of vehicle alignment devices for insuring that the vehicle will be properly positioned over the bolster and not too close to the jacking unit.

A further object of this invention is the provision of a vehicle lifting apparatus adapted to be located entirely above the floor or ground level employing a semi-hydraulic jacking unit.

Still another object of this invention is the provision of an improved semi-hydraulic jacking unit which lowers at an accelerated speed after the load elevated by the jacking unit is released. As will be discussed below, rapid lowering of the jacking unit, and the lifting apparatus connected thereto, is especially important when the lifting apparatus is located completely above the floor or ground level.

Other objects and advantages reside in the construction of parts, the combination thereof, the method of manufacture and the mode of operation, as will become more apparent from the following description.

Referring to the drawings:

FIGURE 1 is a perspective view of one embodiment of a vehicle lifting apparatus made in accordance with this invention.

FIGURE 2 is a side elevational view, with parts broken away and in cross-section, of the apparatus of FIGURE 1.

FIGURE 3 is a cross sectional view of a portion of the lifting apparatus of FIGURE 1 with a portion thereof raised, and illustrates a safety lock mechanism in plan view.

FIGURE 4 is a cross sectional view as viewed in the direction of arrows 4—4 of FIGURE 3.

FIGURE 5 is a vertical cross-sectional view of a jacking unit employed in the lifting apparatus of FIGURE 1.

FIGURE 6 is a cross-sectional view, taken in the direction of arrows 6—6 of FIGURE 5, particularly illustrating a valve assembly incorporated in the jacking unit.

FIGURE 7 is an exploded perspective view of a wheel locater device in accordance with this invention.

FIGURES 8 and 9 are perspective views of a presently preferred embodiment of a vehicle lifting apparatus made in accordance with this invention and showing a lifting cariage in two different positions.

FIGURES 10 and 11 are plan views of the apparatus of FIGURES 9 and 10 and illustrate the manner of positioning an automobile with respect thereto.

Referring in greater detail to FIGURES 1 and 2, vehicle lifting apparatus made in accordance with this invention includes a chassis 10 formed from a pair of parallel, spaced, vertical support members or stanchions 12, each including a vertically disposed track forming member 14. As shown in the drawings, the track members 14 are cylindrical posts. The upper ends of the stanchions 12 are connected by an upper cross-beam or brace 16 and a top plate 18. The chassis 10 further includes a chassis base plate 20 secured to a floor, designated 22, as by a plurality of bolts 36. Some of the bolts 36 may be embedded in the concrete while others are threaded into a pair of parallel, steel H-beams 38 which, to avoid their being obstructions, are lodged in the floor 22 with their top surfaces flush with the top surface of the floor 22. The beams 38, only one of which can be seen in FIGURES 1 and 2, project along both sides of the chassis base plate 20 and fore and aft of the chassis 10, providing, therefore, a broad, elongate support base for the entire lifting aparatus. As will be described in detail below, the lifting apparatus includes a vehicle lifting carriage 40 extending as a cantilever forwardly of the chassis 10. Accordingly, the forward extensions of the H-beams carry or absorb a considerable portion of the loads created by the vehicles to be lifted.

To further insure that the chassis 10 remains in a fixed, upright position, a truss 26 is connected to the base plate 20 and the stanchions 12. The truss 26 may, as shown, include a pair of rearwardly extending rails 28 overlying the H-beams 38 and bolted to the base plate 20, cross-beam 30 overlying the rearward ends of the rails 28, and a pair of braces 32 attached respectively to the stanchions 12 and small vertical plates 34 that are welded or otherwise attached to the beam 30. Several additional bolts 36, again embedded in the floor 22 or threaded in the beams 38, pass through portions of the rails 28 and the beam, 30, and also pass through portions of the rails 28 overlying the base plate 20. The truss 26 is designed to counterbalance the load of a vehicle to be lifted by the apparatus herein. It may be noted at this point that the height of the stanchions 12 can be as desired to suit the needs of the user. The apparatus shown in the drawings is intended to elevate the vehicles to a height of sixty inches or more above ground or floor level. For this reason, the truss 26 must be quite sturdy. As an alternative to the truss construction shown in FIGURES 1 and 2, a truss could be mounted on top of the stanchions 12 to rigidly connect the top of the stanchions 12 to an overhead beam or the like (not shown).

The vehicle lifting carriage 40 has two carriage side plates 42 innerconnected by a brace 44 and a brace plate 46. Supported on the base of the carriage side plates 42 is a bolster or bed 48 upon which is mounted a vehicle frame contacting or engaging assembly adapted simultaneously to engage forward and rearward frame portions of a vehicle on both sides of the vehicle. The assembly illustrated includes four pivotal rails or swing arms 52 rotatably or pivotally mounted by pivot pins 50 on the bolster 48. Upon each rail 52 is a slide 54 supporting a pad construction 56. The pad constructions 56 may be mounted for pivotal movement about a vertical axis on each of the slides 54. Also the pad constructions 56 are desirably mounted for pivotal movement about a horizontal axis. Each pad construction 56 may include a pair of pads rather than the single pad illustrated in FIGURE 1. As will be discussed further, the pivot pins nearest the chassis 10 are separated therefrom by a trackway 58 on the upper surface portion of the bolster 48. For reasons which will be apparent, the leading and trailing edges of the trackway 58 are beveled. The method of pivotal mounting of the rails 52 and the design of the slides 54 and pad constructions 56 may be identical to the corresponding members described in United States patent application of David M. Goldzwig et al., Ser. No. 116,139, filed in the United States Patent Office on June 9, 1961, entitled "Frame Contact Lift" and which issued as Patent No. 3,205,977 on Sept. 14, 1965. To this end, the bolster or pad 48 may be a laminated construction such as shown in Patent No. 3,205,977 rather than a single plate with portions cut away as illustrated in FIGURE 1 herein.

The carriage 40 is guided along the track members 14 in a conventional manner by roller elements 60 pinned to the carriage side plates 42 and engaging the front and rear sides of the members 14. To raise and lower the carriage 40, a flexible motion transmitting element, such as a chain 62, is connected to a carriage beam 64 (FIGURE 2) attached to and extending between the carriage side plates 42. The chain 62 is connected at its other end to a fixture 66 mounted on the top of a connecting rod 68 which is attached at its lowermost end to the base plate 20, as by nuts 70 welded to the base plate 20. Intermediate its ends, the chain 62 engages a pair of pulley or idler wheels 72 mounted on axles 74 which in turn are supported by a pair of support plates 76 welded or otherwise attached to the top of a semi-hydraulic jacking unit 78 which will now be described in detail.

With reference to FIGURE 5, the jacking unit 78 comprises a hollow cylinder 80 closed at its lower end by a cylinder base plate 82 which is mounted, as by bolts (not shown), upon the chassis base plate 20. The cylinder 80 slidably receives a hollow cylindrical piston 84 which is closed at its lower end by a piston base plate 86 and at its upper end by a piston cover plate 88. The cylindrical wall of the piston 84 is separated from the cylindrical wall of the cylinder 80 by a pair of bearing rings 90 innerconnected by a bearing sleeve 92. The jacking unit 78 is substantially filled with oil or other liquid. To avoid leakage, several packing rings 94 are located above the upper bearing ring 90 and held in position by a bearing gland ring 96 connected, as by bolts 98, to an upper cylinder bolt ring 100 which is welded to the cylinder 80. A wiper ring 102 may be located in an annular slot in the gland ring 96. Another annular slot 103 in the gland ring serves as a conventional lubricating groove.

A pair of spaced, restricted liquid passageways 104 and 106 providing communication between the piston 84 and the cylinder 80 are located in the piston base plate 86. As discussed below, the passageway 106 is normally closed. Therefore, as the piston 84 rises, there is a flow of oil relative to the piston base plate 86 through the passageway 104. Likewise, as the piston 84 lowers, there is a relative flow of oil in the opposite direction through the passageway 104. The volume of oil which can flow through the passageway 104 controls the rate of ascent and descent of the piston 84. As conventional in semi-hydraulic jacking units, the piston is caused to rise upon the introduction of air under pressure above the oil in the piston and lowers when the compressed air within the piston is subsequently exhausted to atmosphere. An air supply system for this purpose is described below.

With reference to both FIGURES 1 and 5, air under pressure from a suitable source (not shown) directed along an external air line 108 is piped downwardly along one of the stanchions 12 through an air pipe 114 and through an air control valve, schematically shown at 112, in the direction of the uppermost arrow in FIGURE 1. Air from the control valve 112 is then piped back to the top of the lifting apparatus through an air pipe 110 projecting through the chassis top plate 18 and then through an air pipe line 116 along the top of the top plate 18. The air pipe line 116 is connected, as by a fixture 118, to a coiled, flexible air conduit 120 which extends from the top plate 18 down to the jacking unit 78 and more specifically to an air inlet cylinder 122 (FIGURE 5). The fixture 118 is fixedly attached to the chassis top plate 18 in any suitable fashion. The air inlet cylinder 122, which projects centrally through the piston cover plate 88, is closed at its ends by an inlet top plate 124 and an inlet bottom plate 126. Air under pressure passes from the inlet cylinder 122 into the cavity inside the piston 84 through a plurality of apertures 128 cut in the bottom of the cylindrical body of the cylinder 122. An air baffle 130 located intermediate the upper and lower ends of the inlet cylinder 122, and comprising a flat disc which has been downwardly bent along the peripheral portions thereof, cooperates with the apertures 128 to thoroughly break up the downwardly directed air path which would otherwise enter the piston 84 with sufficient pressure to become entrained in the oil therein. The air control valve 112 mentioned above may be entirely conventional and may have a form such as the valve 50 shown in my copending application Ser. No. 201,151, entitled "Lift Installation," and filed in the United States Patent Office on June 8, 1962, which issued as Patent No. 3,223,124 on Dec. 14, 1965. The air valve 112 is desirably controlled by a suitable operating member (not shown) located on the exposed side of the stanchion 12 to which the valve 112 is connected. By appropriately manipulating the valve 112, air under pressure can be introduced into the piston 84 through the flexible conduit 120, maintained under pressure while the lifting apparatus is in use, and exhausted from the piston 84 through the conduit 120 when it is desired to lower the piston 84.

The restricted passageway 104 is designed to permit a safe, controlled rate of ascent and descent of the piston 84 when loaded, that is, when the bolster 48 is supporting a vehicle. However, if the passageway 104 is small enough to insure safe raising and lowering of the piston 84 when loaded, the passageway 104 will be too small under the no-load condition occurring when the pad constructions 56 lower from engagement with the vehicle frame as the vehicle wheels engage the floor surface. Thus, if only the passageway 104 were available for oil flow between the cylinder 80 and the piston 84, the carriage 40 may lower at an undesirably low speed when not loaded. Aside from being time consuming, this condition could be dangerous since an attempt may be made to drive a vehicle away from the lifting apparatus before the carriage 40 has fully lowered. As a result, both the lifting apparatus and the vehicle could be damaged. To avoid this problem, the passageway 106 is provided with a normally closed spool valve assembly which opens under no-load conditions.

Referring to FIGURE 6, a ring shaped valve element 132 is threaded in the passageway 106. The upper and lower surfaces of the valve element 132 constitute valve seating surfaces adapted to be engaged by dished or arcuate upper and lower valve plates 134 and 136, respectively, having confronting valve surfaces. The plates 134 and 136 are both connected, as by bolts 138 and 140, respectively, to a valve stem 142 mounted for sliding movement within a vertically oriented valve bearing 144 supported centrally of the ring shaped valve element 132 by one or more webs 146. While the piston 84 is rising with the oil therein tending to pass downwardly relative to the passageway 106, there is a higher oil pressure above the piston base plate 86 than below the piston base plate 86. This pressure differential, and gravity, will cause the upper valve plate 134 to seat against the top surface of the valve element 132. Similarly, while the piston is descending, the weight of the vehicle supported by the rails 52 will cause the pressure beneath the piston base plate 86 to be sufficiently great to overcome the tendency of the valve stem 142 to fall, and will hold the lower valve plate 136 in sealing relation to the lower valve surface of the valve element 132. However, once the load is released, the valve stem 142 will lower, through gravity, because the pressure differential above and below the piston base plate 86 will not be so great as when the load is supported on the rails 52. Therefore, the volume of oil that can flow relative to the piston base plate 86 is increased as the load is released and the piston 84 will continue its descent at an accelerated speed. The spool comprising the stem 142 and the plates 134 and 136 is preferably a relatively lightweight metal construction and will gradually fall after the load is released. Normally, the load will be released only a few inches before the piston 84 reaches the lower end of its travel, i.e., in approximately the position illustrated in FIGURE 5. Hence, the spool valve will not close before the piston is fully lowered. For reasons to be discussed, the lowermost bolt 138 is elongate to engage the cylinder base plate 82 to hold the spool valve open when the piston is fully lowered.

When the lifting apparatus described herein is first installed, oil is introduced into the piston 84 through a fill port 150 which normally is capped by a fill plug 152 to which is attached a dip stick 154 used as a gauge to determine the oil level. The oil passes through the apertures 104 and 106 into the cylinder 80. In order to completely fill the cylinder 80, apertures (not shown) in or around the lower bearing 90 and the bearing sleeve 92 provide a passageway for the oil into the upper end of the cylinder 80. A conventional relief valve 164 is connected to the cylinder 80 to exhaust air trapped above the oil therein. The cylinder 80 may accidentally be incompletely filled. Also, after long continued use, the level of oil may be too low for proper operation because of leakage, such as around the packing rings 94. If the oil level is too low and if measures are not taken to correct this problem, the operation of the jacking unit 78 may become erratic due to air under pressure passing through the passageway 104 beneath the piston base plate 86. Air, being compressible, will not give as firm a support to the piston 84 as will oil. Also, if air is under the piston base plate 86, it will escape quite rapidly through the passageway 104 into the cavity within the piston 84. The exhausting of air will be so fast that the piston 84 may drop several inches before there is any control. To obviate this problem, an apertured tube 156 extends through the piston from within the passaway 104 in the base plate 86 into the fill port 150 at the piston cover plate 88. A valve plate 158 is attached to the lower face of the piston base plate 86 and has an aperture therein aligned with the passageway 104. The apertured plate 158 and the lower portion of the passageway 104 cooperate to form a valve seat for a floating valve element 160. The valve element 160 normally will occupy that position shown in FIGURE 5 partially or entirely submerged within the oil within the piston 84 and in abutment or nearly in abutment with the lower end of the dip stick 154. If the oil level within the piston 84 should become dangerously low, the bottom of the float valve 160 will seat within the passageway 104 and block all further flow of oil through the piston base plate 86. The float 160 is so designed that it will seat before any air can pass through the passageway 104. Hence, the low oil conditions described above cannot occur; rather, the continued ascent of the piston 84 will be stopped. When first filling the jacking unit 78 with oil, the float valve 160 may temporarily stick within its seat, thereby closing the passageway 104. However, oil can flow from the piston 84 into the cylinder 80 through the passageway 106 since the spool valve assembly therein is held open by the engagement of the elongate bolt 138 with the cylinder base plate 82.

The rise of the piston 84 within the cylinder 80 is limited by engagement of an enlarged annular flange 162 at the base of the piston 84 with the bottom surface of the lower bearing ring 90. To avoid accidental lowering, the carriage 40 may be held in its raised position by means of a safety lock arrangement shown in FIGURES 3 and 4. This arrangement includes a cylindrical socket member 170 attached to the exposed face of the carriage side plate 42 shown to the left in FIGURE 1. Since behind the brace plate 46, the socket member 170 cannot be seen in FIGURE 1. Housed in the socket member 170 is a lock pin 172 which is biased to the right, as viewed in FIGURE 3, into engagement with the adjacent track forming post 14 by a spring 174 coiled within the socket member 170. As illustrated in FIGURE 3, when the carriage 40 reaches the upper limit of its travel, the lock pin 172 enters an aperture 182 (FIGURE 1) in the adjacent post 14. Accordingly, the carriage 40 will be held in its uppermost position even if the valve 112 is accidentally manipulated to exhaust the air from the piston 84. To release the lock pin 172 from engagement with the aperture 182, a release pin 178 affixed to the lock pin 172 projects through a key-shaped slot 176 in the socket member 170. The release pin 178 may be manually grasped to retract the lock pin 172 from the aperture 182. The pin 178 can be locked in its retracted position by inserting it in an offset portion 176a of the slot 176. When the carriage 40 is subsequently lowered, the release pin 178 strikes the top surface of an angle bar 180 (FIGURES 2 and 3) mounted on the chassis base plate 20 whereupon the release pin 178 is pivoted back into the longitudinal portion of the slot 176. Accordingly, the release pin 178 and the lock pin 172 will be in position to lock the carriage 40 when it is again raised.

Referring again to FIGURE 1, the lifting apparatus described herein is intended to be used as follows. A vehicle to be lifted is driven along the front side of the chassis 10 and positioned such that its front wheels are beyond the rails 52 on the left as viewed in FIGURE 1 and the rear wheels approximately in the position of a wheel locater plate, designated 190, which is spaced from the chassis 10 approximately by the width of an automobile and to the right of the chassis 10 as viewed in FIGURE 1. The wheel locater plate 190 may be used in association with a locating chart or the like indicating the optimum position of the left rear wheel of several makes and models of vehicles relative to the plate 190 such that the pad constructions 56 may be positioned to reach the desired pick-up points on the underbody of the automobile. After the vehicle is properly positioned, the rails 52, slides 54 and pad constructions 56 are appropriately positioned under the vehicle frame pick-up points. The air control valve 112 is then manipulated to introduce air under pressure into the top of the piston 84 as described above. The carriage 40 will then rise, causing the pad constructions 56 to engage the vehicle pick-up points. The vehicle will then be elevated until the lock pin 172 enters the aperture 182. (Of course, the supply of air may be shut off before the carriage 40 is fully raised.) After the work on the vehicle is completed, the lock pin 172 is manually removed from the aperture 182 and the air control valve 112 actuated to exhaust the air from the upper end of the piston 84. The carriage 40 accordingly lowers under the weight of the vehicle until such time as the vehicle wheels engage the floor. As the weight of the vehicle is transferred from the pad constructions 56 to the floor, the spool valve assembly located in the passageway 106 opens. Thereafter, the carriage 40 continues its descent until the bolster 48 reaches ground level. If the release pin 178 was placed in the offset slot portion 176a prior to lowering of the carriage 40, it will be returned to the longitudinal portion of the slot 176 when the carriage is fully lowered by the angle bar 180. As soon as the carriage 40 is fully lowered, the vehicle can safely be backed away from the lift area and the lift is in readiness to be operated again.

Competing considerations enter into the design of the lifting carriage 40, and, especially, the bolster or bed 48. On the one hand, the trackway 58 on the bolster 48 is desirably quite wide to permit the right side of the vehicle to be lifted to clear the chassis 10 while the right front wheel of the vehicle is moving over the trackway 58. On the other hand, the width of the trackway 58 should be as small as possible to minimize the stresses and strains placed on the lifting carriage 40, the chassis 10 and its support. Because of the effort to make the bolster 48, and its trackway 58, as narrow as possible, special precautions should be undertaken to aid in guiding a vehicle into the lift area. To this end, the wheel locater plate 190 is shown positioned over one of two painted guide strips 192 defining the pathway for the vehicle adjacent the chassis 10. Whereas typical wheel locater plates are merely provided with a pair of ribs serving as reference points for positioning a particular vehicle wheel forwardly, centrally or rearwardly thereof, thereby to appropriately locate the vehicle over the lift, the wheel locater plate 190 herein is also designed as a vehicle guide.

Referring to FIGURES 1 and 7, the locater plate 190 comprises a generally flat trackway plate 194 having a pair of parallel, upstanding ribs 196, one at both of its leading and trailing end edges. Further, the locater plate 190 includes a pair of angularly upwardly projecting, generally vertical sidewalls 198 extending along the sides of the trackway plate 194, transverse to the ribs 196. As shown in FIGURE 7, the sidewalls 198 may be connected, as by the welding of tabs 200 thereon, to a base plate 202 provided with depending lugs 204 sunk in the floor or into metal sleeves (not shown) embedded in the floor. The wheel locater plate 190 can either rest on the base plate 202, as illustrated, or it may be connected thereto or integral therewith. The sidewalls 198 are generally V-shaped when viewed from above. Hence, when approached or viewed from either end, surface portions of the sidewalls 198 are mutually convergent. When a vehicle is approaching the lift area, the left front wheel will, if the vehicle is aligned properly, roll over the ribs 196 between the sidewalls 198. If the vehicle is not properly aligned, its left front wheel will also roll over one of the sidewalls 198. The vehicle driver will, therefore, sense the misalignment before the right side of the vehicle nears the chassis 10. Assuming the alignment was initially correct, or has been corrected, the vehicle will continue, with the right front wheel passing over the trackway 58, until the left rear wheel is appropriately positioned relative to the ribs 196. In initially installing the locater plate 190, it is spaced from the chassis 10 sufficiently to enable the left wheels of the widest vehicles intended to be raised by the lifting apparatus to pass between the sidewalls 198. For example, if the widest vehicle to be lifted has a maximum wheel track width of, say, 62 inches, and an overall width of 80 inches, the spacing of the centerline of the wheel locater plate from the closest part of the chassis 10 should be 74 inches or more to provide a two to three inch clearance between the right side of the vehicle and the chassis 10. The wheel locater plate 190 may be about ten inches wide at its narrowest point, and hence is somewhat wider than the average automobile tire.

Referring to FIGURES 8 through 11, a presently preferred embodiment of a vehicle lifting apparatus, generally designated 210, is illustrated with like reference characters applied to like parts. As in the embodiment described above, the vehicle lifting apparatus 210 includes a pair of vertical support members or stanchions 12 with track forming members 14 connected at their upper end by a cross-beam or brace 16. The stanchions 12 may be mounted on a base plate 20 fixed to the floor 22, in this case by clamp plates 212 having bolts 214 sunk in the floor 22 and by bolts 216 passing through the free ends of forwardly projecting leg portions 218 of the base plate 20. The vehicle lifting apparatus 210 further includes a lifting carriage 40 mounted for vertical sliding movement by roller elements 60 on the stanchions 12. The carriage 40 may be identical to the lifting carriage 40 described above except, in the case of FIGURES 8 through 11, the trackway 58 is formed by the bolster or bed 48 and by ramps leading to the bolster or bed 48, the ramps consisting of the leg portions 218 and of ramp plates 220 mounted thereon and connected as by welding thereto. The outermost side edges of the ramp plates 220 are spaced inwardly from the corresponding side edges of the leg portions 218. The side edges of both the leg portions 218 and the ramp plates 220 may be beveled. As apparent with this construction, the bolster or bed 48 need not be beveled along its side edges. Also because the lifting apparatus 210 is secured to the floor 22 by the bolts 216 and the clamp plates 212, the truss assembly 26 described above is not necessary.

The carriage 40 in FIGURES 8 through 11, as in the embodiment described above, may be driven vertically through a chain 62 by jacking unit 78, the chain 62 passing over pulley or idler wheels 72 and being connected to the carriage beam (not shown in FIGURES 8 through 11). Of course, it will be understood that air will be supplied to the jacking unit 78 in a suitable fashion and that the lifting apparatus 210 will have suitable controls for limiting the movement thereof. Also, it will be understood that any of a variety of jacking units may be used in lieu of the jacking unit 78 for purposes of raising and lowering the lifting carriage 40.

Many contemporary automobiles have bodies which ride quite low to the ground and close to the wheels with the lower side edges of the bodies outboard of the wheels. Because of this contemporary automobile design, there is a danger that the trackway 58 or brace plate 46 of the carriage 40 may, with the vehicle positioned over the bolster or bed 48, strike the lower right side edge of the vehicle being lifted. The alignment of the vehicle to be raised relative to the lifting apparatus 210 is, therefore, more critical than usual. Accordingly, the lifting apparatus 210 in FIGURES 8 through 11 is provided with alignment means in addition to the guide strips 192 on the floor 22 and the wheel locater plate 190. The additional alignment means comprises a pair of wheel abutments 222 formed as generally triangular brace plates or gussets, there being one abutment 222 mounted, as by welding, on each of the ramps formed by the forwardly projecting leg portions 218 and the ramp plates 220. The rear faces of the abutments 222 engage the forward faces of the stanchions 12 and may be welded thereto. The forward faces, designated 224, of the abutments 222 lie in a common plane which is above the plane of and closer to the bolster 48 than the carriage brace plate 46 when the carriage 40 is in its lower position illustrated in FIGURE 8. The abutments 222, accordingly, effectively serve to reduce the width of the trackway 58. If the front right wheel of a vehicle approaching the trackway 58 is too close to the stanchions 12 and, accordingly, to the lowered carriage brace plate 46, it will strike the abutment 222 nearest thereto and the vehicle operator will be warned that the vehicle must be realigned with respect to the lifting apparatus 210. It is thereby seen that the wheel locater plate 190 defines a path for the wheels of a vehicle remote from the jacking unit 78 and serves roughly to indicate to the vehicle operator the proper position of the vehicle approaching the trackway 58. The abutments 222 serve to more accurately indicate proper alignment. Of course, it will be appreciated that a vehicle approaching the trackway 58 which is too far to the left as viewed in FIGURE 10 would strike the forward ends of the leg portion 218 and the ramp plate 220 nearest thereto and, accordingly, the vehicle operator would be warned that the vehicle is too far from the stanchions 12.

Referring to FIGURES 10 and 11, the rails or swing arms 52 are each of the same length and are each pivoted about the pivot pins 50 in cut-off portions or sockets in the bolster 48, the sockets closest to the jacking unit 78 being identified by reference character 226 and the sockets farthest from the jacking unit 78 being identified by the reference character 228. The vertical sidewalls of the sockets 226 and 228, which are surface portions of the bolster 48, restrict the pivotal movement of the rails 52. As apparent, the pivot pins 50 are arranged in a rectangular array with the center of the rectangular array, herein termed the "pivot center," designated 50a in FIGURES 10 and 11. In prior swing arm lift constructions, the pivot center of four rails or arms mounted on a common bolster was on the longitudinal centerline of the lift. A vehicle driven thereover is ordinarily placed such that its longitudinal centerline overlies the pivot center. In accordance with this invention, however, the pivot center 50a is closer to the jacking unit 78 than would be the centerlines of most vehicles elevated thereby. In FIGURES 10 and 11 a vehicle V is indicated by broken lines with its longitudinal centerline CL to the left of the pivot center 50a. This relationship of the vehicle V to the rails 52 results from the ordinary usage of the lift in which the leftf ront tire T1 of the vehicle V passes over the wheel locater plate 190 when approaching the lifting area as shown in FIGURE 10, and the right front tire T2 passes over the trackway 58 clear of the abutments 222. Thus, the wheel locater plate 190 is laterally spaced from the pivot center 50a by a distance which is greater than the lateral spacing of the track way 58 from the pivot center 50a.

As shown in FIGURE 11, the rails 52 farthest from the jacking unit 78 are pivoted outwardly at a greater angle from the vehicle centerline CL at an angle greater than the angle of the rails 52 closest to the jacking unit 78. As obvious, such positioning of the rails 52 will ordinarily be necessary because of the displacement of the vehicle centerline CL from the pivot center 50a. For this reason, the sockets 228 are designed to permit pivotal movement of the rails 52 received therein through an angle of approximately 90°. The sockets 226, on the other hand, are designed to permit pivotal movement of the rails 52 received thereby through a much smaller angle because, ordinarily, the rails 52 closest to the jacking unit 78 need only be pivoted through an angle of less than 45°. By so limiting the pivotal movement of the rails 52 closest to the jacking unit 78, the rails 52 need be moved by only a very small amount to remove them from the path of the vehicle wheel T2 which passes over the trackway 58. Because the rails 52 farhest from the jacking unit 78 can pivot through a relatively large angle, the lifting apparatus 210 can be used to elevate a variety of vehicles with considerably different widths.

As apparent from the foregoing, a single lift installation for raising a vehicle has been provided which is completely above the ground or floor level. Lifting apparatus of this type are especially useful in areas where it is difficult or impossible to use lifts having jacking units located below floor level. In the past, above ground installations normally required a pair of jacking units or expensive, rather complicated, interlocking mechanisms for plural lifting carriages. As a practical matter, above ground frame contact lifting apparatus have been rarely used. The features of both embodiments of lifting apparatus described above now make above ground frame contact lifting conveniently available. Because of the trackway 58 on the bolster 48 separating the pivot points of the rails 52 from the chassis 10, a vehicle wheel passing over the bolster 48 does no harm to the lifting mechanism. As is typical in below ground, or pit, installations, it is merely necessary that the rails 52 are positioned inwardly of the vehicle wheel paths before driving the vehicle over the rails 52. Since the additional passageway 106 in the semi-hydraulic jacking unit described above opens after the vehicle wheels touch ground upon lowering, the user of the lift installation can be reasonably assured that the vehicle can be quickly driven back over the trackway 58 without damage.

As will be apparent to those skilled in the art, the chain 62 and the pulleys 72 arrangement causes the lifting carriage 40 to rise at twice the rate of the piston 84. This feature is desirable to reduce the overhead space required for so-called "high-rise" lift installations. For other purposes, any conventional direct connections could be used to attach the piston 84 to the carriage 40. If directly connected, of course, the carriage 40 would rise at the same rate as the piston 84.

Having thus described my invention, I claim:

1. A vehicle lifting apparatus comprising: a chassis mounted on a support surface; a lifting carriage mounted for vertical movement on said chassis from and above said support surface, said carriage including a bolster and vehicle frame engaging means mounted on said bolster for simultaneously engaging the front and rear of both sides of a vehicle, said bolster having a trackway formed thereon between said chassis and said frame engaging means sufficiently wide to permit a vehicle wheel to pass over said bolster between said vehicle frame engaging means and said chassis; a semi-hydraulic jacking unit mounted on said chassis, said jacking unit including a piston movable in a cylinder, said piston having an air inlet for the introduction of air under pressure into said piston above the level of liquid therein, the lower end of said piston having a pair of restricted liquid passageways, liquid pressure operated valve means in one of said liquid passageways blocking the flow of liquid therethrough while a vehicle is supported by said vehicle frame engaging means, said valve means opening in response to a change in pressure resulting from release of the vehicle from said vehicle frame engaging means to increase the rate of liquid flow relative to the piston thereby increasing the speed of descent of the piston after the vehicle is released; and motion transmitting means interconnecting said jacking unit and said carriage.

2. The structure of claim 1 wherein said valve means opens and closes in response to changes in the pressure differential in said jacking unit above and below the base of said piston.

3. The structure of claim 2 wherein said valve means includes a pair of valve seating surfaces, one at each end of said one of said passageways, a valve stem slidably supported within said one of said passageways, and a pair of valve plates, one at each end of said valve stem, connected to said valve stem and having valve surfaces adapted to mate with said valve seating surfaces.

4. A vehicle lifting apparatus comprising: a pair of stanchions; means mounting said stanchions on a support surface; a lifting carriage mounted for vertical movement on said stanchions from the level of said support surface upwardly along said stanchions, said carriage including a bolster and vehicle frame engaging means mounted on said bolster adapted to engage and raise an automobile upon elevation of said carriage, said vehicle frame engaging means being connected to said bolster at points separated from said stanchions by a trackway which is sufficiently wide for a vehicle wheel to pass over said bolster between said points and said stanchions; a semi-hydraulic jacking unit including a piston movable in a cylinder, said piston having an air inlet for the introduction of air under pressure into said piston above the level of liquid therein, the lower end of said piston having a pair of restricted liquid passageways, liquid pressure operated valve means in one of said liquid passageways blocking the flow of liquid therethrough while a vehicle is supported by said vehicle frame engaging means, said valve means opening in response to a change in pressure resulting from release of the vehicle from said vehicle frame engaging means to increase the rate of liquid flow relative to the piston thereby increasing the speed of descent of the piston after the vehicle is released; and motion transmitting means interconnecting said jacking unit and said carriage operative to raise said carriage upon actuation of said jacking unit.

5. The structure of claim 4 wherein said valve means opens and closes in response to changes in the pressure differential in said jacking unit above and below the base of said piston.

6. The structure of claim 4 wherein said valve means includes a pair of valve seating surfaces, one at each end of said one of said passageways, a valve stem slidably supported within said one of said passageways, and a pair of valve plates, one at each end of said valve stem, connected to said valve stem and having valve surfaces adapted to mate with said valve seating surfaces.

7. In a jacking unit of the type having a hollow cylinder, a hollow piston vertically movable relative to said cylinder and mounted in said cylinder, said cylinder and said piston having liquid therein, said piston having a restricted liquid passageway at its lower end communicating with said cylinder, and means for supplying air under pressure into the upper end of said piston above the level of liquid therein to raise said piston relative to said cylinder, said piston lowering upon release of the air under pressure from above the level of liquid in said piston, said passageway providing for flow of liquid relative to said piston at a rate adequate to permit a predetermined speed of travel of said piston when lowering while supporting a load, the improvement comprising a second liquid passageway providing communication between said cylinder and said piston in the lower end of said piston, and liquid pressure operated valve means closing said second liquid passageway when a load is supported by said jacking unit, said valve means opening in response to a change in pressure resulting from release of the load to increase the rate of liquid flow relative to the piston thereby increasing the speed of descent of the piston under no-load conditions.

8. The improvement of claim 7 wherein said valve means includes a pair of valve seating surfaces, one at each end of said second passageway, a valve stem slidably supported within said second passageway, and a pair of valve plates, one at each end of said valve stem, connected to said valve stem and having valve surfaces adapted to mate with said valve seating surfaces.

9. For use with a vehicle lifting device having a chassis mounted on a support surface, a vehicle wheel locater plate comprising a flat plate having a pair of parallel, upstanding ribs, and a pair of generally vertical sidewalls, one on each side of said flat plate and generally transverse to said ribs, said sidewalls having mutually converging surface portions adapted to aid in guiding a vehicle wheel on and over said flat plate.

10. A floor-mounted lifting apparatus comprising a lifting carriage including a bolster, a jacking unit mounted on the floor, motion transmitting means connecting said jacking unit to said carriage for vertically elevating said carriage, four lifting rails having means thereon for engaging the frame of a vehicle, and pivot means connecting one end of each of said rails to said bolster for pivotal movement about a vertical axis, said pivot means being spaced from said jacking unit and said rails being positionable from said jacking unit by a distance sufficient to permit a wheel on one side of a vehicle to move in a path between said jacking unit and said pivot means when said carriage is lowered whereby a vehicle may be driven over said pivot means and said rails without engaging said rails or said pivot means to a position beside said jacking unit to be lifted by said rails.

11. The apparatus of claim 10 wherein said carriage further includes a trackway defining said path between said pivot means and said jacking unit.

12. The apparatus of claim 11 wherein said trackway is formed on said bolster.

13. The apparatus of claim 11 wherein abutments mounted adjacent said trackway and on the same side of said trackway as said jacking unit prevent the positioning of a vehicle too close to said jacking unit.

14. The apparatus of claim 11 further including stop means restricting pivotal movement of each of said rails, one pair of said rails being restricted by said stop means to pivotal movement through a smaller angle than the other pair of said rails.

15. The apparatus of claim 14 wherein said rails are each pivoted about a vertical axis spaced from the pivotal axis of each of the other rails.

16. The apparatus of claim 15 wherein the pivot axes of said one pair of said rails is closer to said jacking unit than the pivot axes of the other pair of said rails.

17. The apparatus of claim 16 wherein said pivot axes of said rails are arranged in a rectangular array and wherein a wheel locater plate is mounted on said floor in a predetermined, spaced relationship to said carriage on the opposite side of said bolster from said jacking unit, said wheel locater plate being positioned to permit a vehicle wheel on one side of a vehicle to pass thereover prior to a vehicle wheel on the other side of said vehicle passing over said trackway, and said wheel locater plate defining a path for a vehicle wheel spaced further from the center of said rectangular array of said pivot axes than is the trackway formed on said carriage.

18. The apparatus of claim 17 wherein abutments mounted adjacent said trackway and on the same side of said trackway as said jacking unit prevent the positioning of a vehicle too close to said jacking unit.

19. The apparatus of claim 17 wherein said wheel locater plate includes a pair of sidewalls having mutually converging, generally vertical surface portions adapted to aid in guiding said vehicle adjacent to said jacking unit and over said bolster.

References Cited
UNITED STATES PATENTS

| | | | |
|---|---|---|---|
| 2,638,075 | 5/1953 | Towler | 91—4 |
| 2,827,979 | 3/1958 | Thompson | 187—8.41 |
| 2,843,222 | 7/1958 | Villars | 187—8.41 |
| 2,878,897 | 3/1959 | Cochin | 187—8.75 |
| 2,915,143 | 12/1959 | Simmons | 187—8.41 |
| 3,048,238 | 8/1962 | Wallace | 187—8.52 |
| 3,203,317 | 8/1965 | Taylor | 91—4 |

FOREIGN PATENTS

| | | |
|---|---|---|
| 1,084,004 | 6/1960 | Germany. |
| 643,197 | 7/1962 | Italy. |

RICHARD E. AEGERTER, *Primary Examiner.*

H. C. HORNSBY, *Assistant Examiner.*

U.S. Cl. X.R.

91—4; 187—8.75, 8.77